(12) United States Patent
Ljung

(10) Patent No.: US 11,906,613 B2
(45) Date of Patent: Feb. 20, 2024

(54) ELECTRONIC DEVICE, AN ELECTRONIC REFERENCE DEVICE, AND RELATED METHOD FOR POSITIONING OF THE ELECTRONIC DEVICE

(71) Applicant: Sony Group Corporation, Tokyo (JP)

(72) Inventor: Peter Ljung, Lund (SE)

(73) Assignee: Sony Group Corporation, Tokyo (JP)

( * ) Notice: Subject to any disclaimer, the term of this patent is extended or adjusted under 35 U.S.C. 154(b) by 251 days.

(21) Appl. No.: 17/338,438

(22) Filed: Jun. 3, 2021

(65) Prior Publication Data
US 2021/0396863 A1    Dec. 23, 2021

(30) Foreign Application Priority Data

Jun. 17, 2020 (SE) .................................. 2050729-9

(51) Int. Cl.
*G01S 13/08* (2006.01)
*G01S 13/524* (2006.01)
*G01S 7/28* (2006.01)

(52) U.S. Cl.
CPC ............... *G01S 13/08* (2013.01); *G01S 7/28* (2013.01); *G01S 13/5246* (2013.01); *G01S 13/5248* (2013.01)

(58) Field of Classification Search
CPC ........ G01S 7/28; G01S 13/08; G01S 13/5246; G01S 13/5248
See application file for complete search history.

(56) References Cited

U.S. PATENT DOCUMENTS 9,432,882 B2  8/2016  Emadzadeh
9,609,482 B1  3/2017  Want
(Continued)

FOREIGN PATENT DOCUMENTS

CN    109541529 A   3/2019
WO     03062850 A2  7/2003
WO   2015118135 A1  8/2015

OTHER PUBLICATIONS

Office Action with Swedish Search Report from corresponding Swedish Application No. 2050729-9, dated Mar. 24, 2021, 10 pages.
(Continued)

*Primary Examiner* — Bernarr E Gregory
*Assistant Examiner* — Hailey R Le
(74) *Attorney, Agent, or Firm* — Tucker Ellis LLP

(57) ABSTRACT

An electronic device includes memory circuitry, interface circuitry, and processor circuitry. The processor circuitry is configured to transmit, to a plurality of electronic reference devices, a first signal, the first signal having a pulse width below a threshold. The processor circuitry is configured to determine, based on the received second signals and at least one predetermined time period, a time of flight of each of the second signals. The processor circuitry is configured to obtain, from the memory circuitry, reference positions of the plurality of electronic reference devices. The processor circuitry is configured to determine, based on the associations, one or more candidate positions of the electronic device. The processor circuitry is configured to determine, based on the distances, the one or more candidate positions, and the obtained reference positions, a position of the electronic device.

21 Claims, 11 Drawing Sheets

(56) References Cited

U.S. PATENT DOCUMENTS

| | | | |
|---|---|---|---|
| 9,864,946 B2 | 1/2018 | Richley | |
| 10,064,012 B1 | 8/2018 | Boston | |
| 10,462,762 B2 | 10/2019 | Hollar | |
| 2008/0180218 A1* | 7/2008 | Flax | G16H 40/20 |
| | | | 704/E15.047 |
| 2010/0257941 A1* | 10/2010 | Gysling | G01F 1/667 |
| | | | 73/861.28 |
| 2017/0168135 A1 | 6/2017 | Want | |
| 2018/0038940 A1* | 2/2018 | Want | G01S 5/14 |
| 2019/0129025 A1 | 5/2019 | Kaufmann | |
| 2019/0179004 A1* | 6/2019 | Okada | G01S 13/785 |
| 2019/0223136 A1 | 7/2019 | Miermont | |
| 2020/0064439 A1* | 2/2020 | Przybyla | G01S 5/0036 |
| 2021/0173037 A1* | 6/2021 | Que | G01S 5/02216 |
| 2021/0207977 A1* | 7/2021 | Lee | G06V 20/588 |

OTHER PUBLICATIONS

Shaohua Huang, et al., "A real-time location system based on RFID and UWB for digital manufacturing workshop," The 50th CIRP Conference on Manufacturing Systems, Procedia CIRP 63, pp. 132-137, dated 2017.

* cited by examiner

ELECTRONIC DEVICE, AN ELECTRONIC REFERENCE DEVICE, AND RELATED METHOD FOR POSITIONING OF THE ELECTRONIC DEVICE

RELATED APPLICATION DATA

This application claims the benefit of Swedish Patent Application No. 2050729-9, filed Jun. 17, 2020, the disclosure of which is incorporated herein by reference in its entirety.

TECHNICAL FIELD

The present disclosure pertains to the field of positioning. The present disclosure relates to an electronic device, an electronic reference device and to a method for positioning of the electronic device.

BACKGROUND

There exist many different positioning techniques to determine an absolute position of electronic devices (such as an indoor position) where no GPS positioning is available or viable for example. For example, positioning may be determined using a number of different techniques such as measurement of time of flight of a signal, round trip time measurement between two nodes, arrival time of a specific signal to different nodes, measurement of phase difference of a signal (for example, for determining an angle of arrival or angle of departure of a signal), phase shift between two signals when frequency is changed for one of them, measurement of received signal strength, and measurement if signal is received at all. These techniques may be deployed using a number of different mediums such as radio waves, for example Bluetooth, Wi-Fi, ultra-wide band, UWB, light waves (such as infra-red light), and/or sound waves (such as ultra-sonic sound).

SUMMARY

Existing electronic devices and methods may use round trip measurements (typically using 3 messages back and forth between an electronic device and an electronic reference device). However, a challenge with such solutions is that they may not be scalable for a large configuration with a large number of electronic devices and/or electronic reference devices (such as thousands of tags). For example, when each electronic device needs to measure the distances to at least 3 electronic reference devices, a large number of signals and messages are created.

For example, a challenge with multi-lateration (such as time difference of arrival, TDoA) may be that the electronic reference devices need to time-synchronize down to, for example, pico seconds, ps. For example, radio waves travel 300 m every microsecond, ps, that is 100 μs for 3 cm. There is a need for a technique that allows an electronic device to be positioned in a faster, and more efficient manner. There is a need for providing an electronic device capable of being positioned in a scalable and efficient manner.

Accordingly, there is a need for electronic devices, electronic reference devices, methods performed in an electronic device, for determining a position of the electronic device, and methods performed in an electronic reference device, for assisting a determining of a position of an electronic device, which mitigate, alleviate or address the shortcomings existing and provide an improved positioning of electronic devices (such as improved positioning of electronic devices in a configuration with electronic reference devices), with improved precision, improved speed of positioning, improved power consumption, and improved scalability.

An electronic device is provided, the electronic device comprises memory circuitry, interface circuitry, and processor circuitry. The processor circuitry is configured to transmit, to a plurality of electronic reference devices, a first signal, the first signal having a pulse width below a threshold. The processor circuitry is configured to receive second signals from the plurality of electronic reference devices comprising a first electronic reference device, and a second electronic reference device. The processor circuitry is configured to determine, based on the received second signals and at least one predetermined time period, a time of flight of each of the second signals. The processor circuitry is configured to determine, based on each time of flight, distances between the electronic device and each electronic reference device of the plurality of electronic reference devices, the distances comprising a first distance, and a second distance. The processor circuitry is configured to obtain, from the memory circuitry, reference positions of the plurality of electronic reference devices. The processor circuitry is configured to associate the first distance with a first candidate electronic reference device having one of the reference positions. The processor circuitry is configured to associate the second distance with a second candidate electronic reference device having one of the remaining reference positions. The processor circuitry is configured to determine, based on the associations, one or more candidate positions of the electronic device. The processor circuitry is configured to determine, based on the distances, the one or more candidate positions, and the obtained reference positions, a position of the electronic device.

Further, an electronic reference device is provided, electronic reference device the comprising memory circuitry, interface circuitry, and processor circuitry. The processor circuitry is configured to receive a first signal from an electronic device. The processor circuitry is configured to upon expiry of at least one predetermined time period, transmit, to the electronic device, a second signal having a pulse width below a threshold.

Further a method is disclosed, the method comprising transmitting, to a plurality of electronic reference devices, a first signal, the first signal having a pulse width below a threshold. The method comprising receiving second signals from the plurality of electronic reference devices comprising a first electronic reference device, and a second electronic reference device. The method comprising determining, based on the received second signals and at least one predetermined time period, a time of flight of each of the second signals. The method comprising determining, based on each time of flight, distances between the electronic device and each electronic reference device of the plurality of electronic reference devices, the distances comprising a first distance, and a second distance. The method comprising obtaining, from the memory circuitry, reference positions of the plurality of electronic reference devices. The method comprising associating the first distance with a first candidate electronic reference device having one of the reference positions. The method comprising associating the second distance with a second candidate electronic reference device having one of the remaining reference positions. The method comprising determining, based on the associations, one or more candidate positions of the electronic device. The method comprising determining, based on the distances, the one or more candidate positions, and the obtained reference positions, a position of the electronic device.

Further, a method, performed in an electronic reference device, for assisting a determining of a position of an electronic device is disclosed. The method comprising receiving a first signal from the electronic device. The method comprising upon expiry of at least one predetermined time period, transmitting, to the electronic device, a second signal having a pulse width below a threshold.

It is an advantage of the present disclosure that it enables an electronic device to be positioned with an improved positioning (such as improved positioning of electronic devices in a configuration with a plurality of electronic reference devices).

Further, it is an advantage of the present disclosure that precision of the positioning of the electronic device is improved.

Further, it is an advantage of the present disclosure that the positioning of the electronic device may be performed in a faster manner.

It may be appreciated that the present disclosure provides positioning of electronic devices with an improved power consumption (for example the power efficiency improvements may be achieved by minimizing signal length (such as message length). For example, the first signal (such as request) and the second signals (such as echoes) may be provided in parallel and not only depending on signal length.

Further, it is an advantage of the present disclosure that the electronic device may be configured with an improved scalability of the positioning technique.

It may be appreciated that the present disclosure provides flexibility of the medium or channel used for the positioning of the electronic device is performed (for example the present disclosure may use UWB and/or ultra-sonic distance measurements). For example, compared with UWB positioning, ultrasonic distance measurements share the same properties of a very accurate distance measurements (down to millimeters) using time of flight (of sound waves).

An advantage of the present disclosure is that there is no need for synchronization across electronic reference devices, such as synchronized clocks (such as for the electronic reference devices).

BRIEF DESCRIPTION OF THE DRAWINGS

The above and other features and advantages of the present disclosure will become readily apparent to those skilled in the art by the following detailed description of example embodiments thereof with reference to the attached drawings, in which.

DETAILED DESCRIPTION

Figure 1:
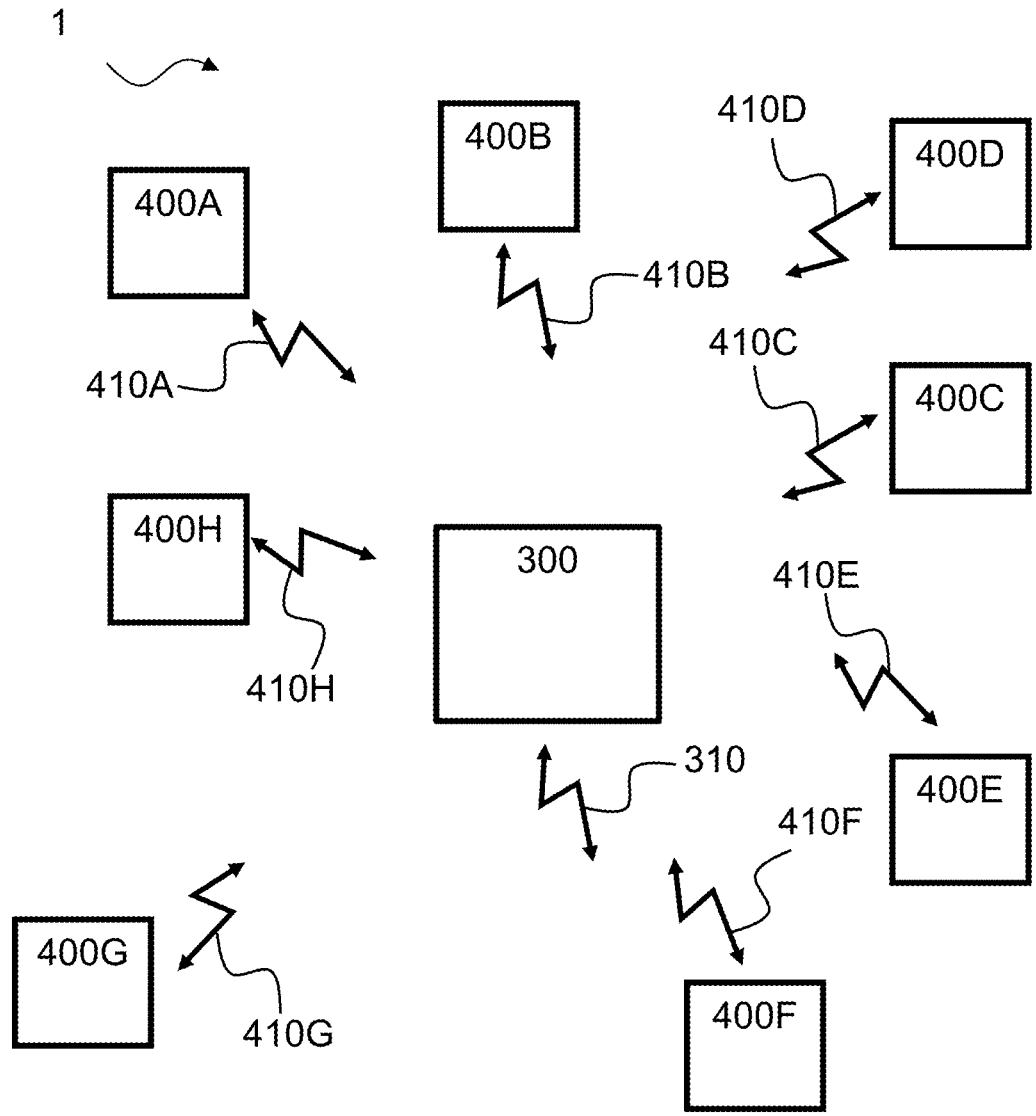
FIG. 1 is a schematic representation illustrating an example system according to one or more embodiments of this disclosure.

Various example embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The figures are schematic and simplified for clarity, and they merely show details which aid understanding the disclosure, while other details have been left out. Throughout, the same reference numerals are used for identical or corresponding parts.

FIG. 1 is a schematic representation illustrating an example system 1 according to one or more embodiments of this disclosure. The system 1 comprises an electronic device 300 and a plurality of electronic reference devices 400A-H.

The plurality of electronic reference devices may comprise N electronic reference devices, wherein N is an integer ranging from 2 to 10000, for example ranging from 2 to 1000, 5 to 500, 10 to 250, 20 to 100, 5 to 10000, 10 to 10000, 100 to 10000, 5 to 1000, 10 to 1000, 20 to 1000, 10 to 500, 20 to 500, 20, 250, 2 to 100, 5 to 100, 10 to 100, and/or 20 to 100. The number N of electronic reference devices may for example vary depending on the size of the area where the electronic device has to be positioned, the precision of the positioning, and/or the pattern of the electronic reference devices.

The electronic device 300 may comprise a tag. An electronic device disclosed herein may be seen as a tag device (such as an asset tag), and/or a beacon device (for example, a static beacon installed in a building, such as for positioning mobile devices).

An electronic reference device disclosed herein may be seen as an anchor device, a reader device, and/or a gateway device and/or a Fixed Reference Point device.

An electronic reference device is seen as a computing device configured to communicate with one or more electronic devices. An electronic reference device (e.g., a first electronic device reference 400A) may be configured to support a positioning or location system 1 in obtaining a position of the electronic device 300. An electronic reference device (e.g., the first electronic reference device 400A) may be configured to communicate using a wireless communication system. For example, an electronic reference device listens for signals from an electronic device. For example, an electronic reference device may be static positioned and used for scanning for the electronic device(s).

The electronic device 300 transmits, to a plurality of electronic reference devices 400A-H, a first signal 310, the first signal having a pulse width below a threshold. The first signal 310 may be seen as a "blink" signal. The electronic device 300 receives second signals 410A-H from the plurality of electronic reference devices 400A-H. The second signals 410A-H may be seen as "echo" signals responding to the first signal 310. The electronic device 300 determines, based on the received second signals 410A-H and at least one predetermined time period, a time of flight of each of the second signals 410A-H.

The electronic device 300 determines, based on each time of flight, distances between the electronic device 300 and each electronic reference device of the plurality of electronic reference devices 400A-H, the distances comprising a first distance, and a second distance. The electronic device 300 obtains, from the memory circuitry, reference positions of the plurality of electronic reference devices 400A-H. The electronic device 300 associates the first distance with a first candidate electronic reference device having one of the reference positions. The electronic device 300 associates the second distance with a second candidate electronic reference device having one of the remaining reference positions. The electronic device 300 determines, based on the associations, the one or more candidate positions of the electronic device. The electronic device 300 determines, based on the distances, the one or more candidate positions, and the obtained reference positions, a position of the electronic device.

The disclosure provides a technique based on a round trip measurement from the electronic device to the plurality of electronic reference devices simultaneously in parallel. In other words, the electronic device, such as a tag, that needs to be positioned sends for example a first signal, such as a single broadcast (such as a "blink"). The surrounding electronic reference devices, such as anchors, returns (such as "echo") the first signal, ("blink"). The electronic device receives echoes separated in time domain from electronic reference devices and can determine round trip time. It may be envisaged that in some situations, reflections can be filtered out by using only the first echo of each group of echoes from each electronic reference device. This means that instead of at least 3 round trip measurements, only one round trip measurement is needed. For example, the electronic reference devices may be differentiated locally (such as by adding a few bits of "local" identity in the second signals). In turn, a local group (such as set of anchors that is within a range of the electronic device position) of electronic reference devices may have the same local ID and may then be selected by the electronic device.

Alternatively, or additionally, each electronic reference devices may have different predetermined time periods (such as different constant delays in each anchor locally), to for example separate each electronic reference device in time (such as in a group). In this way, the receiving window of the electronic device for receiving second signals may be increased (for example when the electronic reference devices are grouped in time).

Alternatively, or additionally, the reflections (such as reflection echoes) may be handled in search and match algorithm.

For example, the electronic device may receive a number of second signals (such as echoes) separated in time domain. In one or more embodiments, one or more second signals may be indicative of reflection signals. In some embodiments, the reflections from a single electronic reference device may differ by several meters. A reflection may be due to an indirect path of the second signal (such as radio signal) sent from the electronic reference device. In other words, it may not be possible to assume that indirect path of the second signal is close in distance from the direct path of the second signal. In some embodiments, the electronic device may receive second signals (such as a set of second signals, for example a set of echoes) where some of the second signals are direct in path, and some other are reflections, and thereby indirect in path. In one or more embodiments, the predetermined time period may be different for each electronic reference device. For example, an integer k may be used to determine the predetermined time period by multiplying k with a constant delay value where k is a unique integer for each electronic reference device. In other words, the electronic device and/or the electronic reference device may be configured to generate the predetermined time period, for each electronic reference device, based on k*constant delay where k is an integer. This may allow the second signals ("echoes") to be spread out, for example in different windows of 200 ns.

In some embodiments, the electronic device may be configured to filter the received second signals, for example based on a criterion, such as searching for the best matches allowing a percentage of second signals not to be used for determining distances and/or filtering the determined distances that are not assumed to match the reference positions (such as assuming that some second signals are false).

Figure 2:
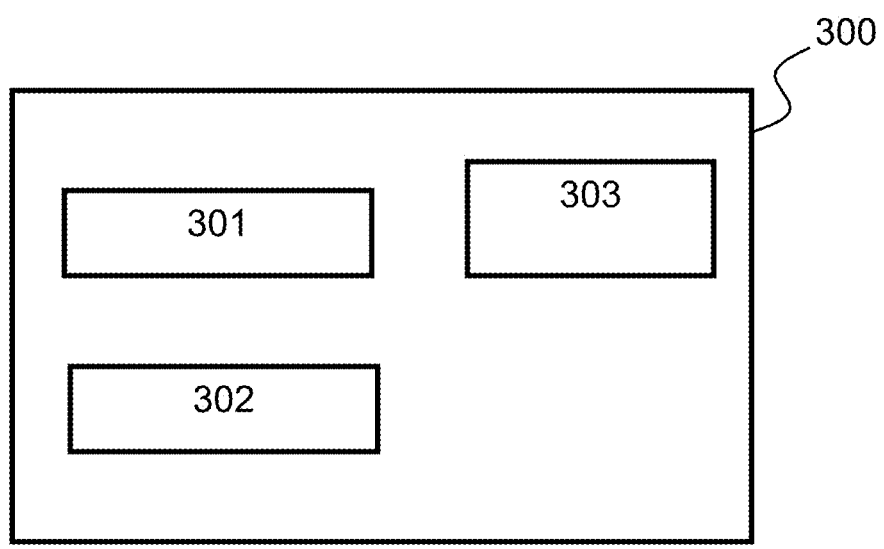
FIG. 2 is a block diagram illustrating an example electronic device according to this disclosure.

FIG. 2 is a block diagram illustrating an example electronic device 300 according to one or more embodiments of the present disclosure.

The electronic device 300 comprises memory circuitry 301, processor circuitry 302, and interface circuitry 303. The electronic device 300 may comprise a tag (such as positioning tag to be positioned and/or located, for example an electronic device that is to be positioned). The interface circuitry 303 is configured for wireless communications with a plurality of electronic reference devices.

The processor circuitry 302 is configured to transmit (such as broadcast), to a plurality of electronic reference devices (such as via the interface circuitry 303) a first signal, the first signal having a pulse width below a threshold. In other words, the processor circuitry 302 may be configured to send the first signal (such as a first broadcast signal, for example a single broadcast). The first signal may comprise a blink message, such as an echo request (for example a request to a plurality of electronic reference devices).

In one or more example electronic devices, the first signal comprises a request for response to the first signal.

The first signal having a pulse width below a threshold may have a narrow pulse width (such as a short pulse below a time threshold, for example the first signal may be a blink signal). In one or more example electronic devices, the threshold provides an upper limit to the pulse width of the first signal, the upper limit being 10 ns (nanoseconds). The threshold may provide an upper limit to the pulse width of the first signal of 10 ns, such as less than 8 ns, less than 6 ns, less than 4 ns, less than 2 ns, and/or less than 1 ns (for example for ultra-wide band). In one or more embodiments, the pulse width is ranging from 1 ns to 10 µs. For example, the pulse width is ranging from 1 ns to 5 µs, 2 ns to 1 µs, 5 ns to 500 ns, 10 ns to 250 ns, 50 ns to 100 ns, 500 ns to 5 µs, 1 µs to 5 µs, 1 µs to 10 µs, 1 ns to 10 ns, 2 ns to 8 ns, and/or 4 ns to 6 ns. In other words, the upper limit may be configured such that it is above and/or matches the shortest possible pulse width that can be detected in time using the wireless positioning technology employed.

The pulse width of the first signal may be dependent on a number of symbols of the first signal (such as the content of the first signal). For example, there exists a relationship between the pulse width and the content of the first signal (such as a number of symbols carried by the first signal).

For example, the pulse width may be below a threshold so as to achieve a narrow pulse width. In other words, the amount of information carried by the first signal is below a threshold (such as a few bits of information, for example less than 4 bits, such as less than 3 bits, such as less than 2 bits) so as to achieve a pulse width that is below a threshold.

In some embodiments, there may be a minimum and/or a maximum amount of data (such as bits and/or symbols) comprised in the first signal. For example, a first signal having a single pulse of a given width may represent or be indicative of a single bit of information.

In some embodiments, the first signal comprises a single bit of information without the preamble (for example, the single bit of information does not include the preamble). The preamble is for example a sequence pulses of known pattern. A first signal without preamble may be denoted a single pulse.

In some embodiments, the first signal may comprise more than a single bit of information to include the preamble. In other words, the first signal may comprise the preamble in addition to message data, such as an identifier.

In some embodiments, the pulse width of the first signal may be increased (such as broader) to improve robustness in decoding. However, the content of the first signal may remain the same.

The first signal (such as message) may comprise one or more pulses each representing a bit of information. The minimum message may be a single pulse. In some embodiments, the first signal may have different pulse widths (for example depending on the modulation scheme, such as comprising several periods of a wave). In one or more embodiments, the threshold may comprise an absolute time limit of the pulse width.

In one or more embodiments, the second signals have a pulse width below a threshold. In one or more embodiments, the threshold provides an upper limit to the pulse width of the second signals. In some embodiments, the threshold for the second signals may be the same as the threshold for the first signal. In some embodiments, the threshold for the second signals may be different than the threshold for the first signal.

The processor circuitry 302 is configured to receive (such as via the interface circuitry 303) second signals (such as a plurality of second signals, for example two or more second signals) from the plurality of electronic reference devices (such as all or part of the surrounding electronic reference devices, such as anchors). The plurality of electronic reference devices comprises a first electronic reference device, and a second electronic reference device. The second signals may comprise a plurality of echoes from the plurality of electronic reference devices (such as in response to the first signal, such as in response to the broadcasted first signal, for example in response to and/or returns an echo request from the electronic device). The second signals may comprise for example a second primary signal from the first electronic reference device, a second secondary signal from the second electronic reference device, and/or a second tertiary signal from a third electronic reference device.

In one or more example electronic devices, the first signal and/or the second signal comprises a single-bit symbol. In other words, in some embodiments, the first signal and/or the second signal comprises a single-bit symbol, such as a single symbol (for example the second signal corresponding to the first signal, such as corresponding to an echo request of the first signal).

The plurality of electronic reference devices may comprise a plurality of anchor devices, such as electronic anchor devices.

The processor circuitry 302 is configured to determine, based on the received second signals and at least one predetermined time period, a time of flight of each of the second signals. For example, the processor circuitry 302 may be configured to determine, based on the received second signals and at least one predetermined time period, a round trip time (such as from the electronic device to the electronic reference device and back to the electronic device) to determine the time of flight of each of the second signals. The time of flight may be seen as the time it takes a signal to travel from one device to the other, for example from the electronic reference device to the electronic device or vice versa, for example from the anchor to the tag . . . . For example, the time of flight of each second signals may be determined based on subtracting the predetermined period from the round-trip time determined, and then dividing the subtraction result by two.

The predetermined time period may comprise an anchor delay (such as a delay known to both the electronic device and the electronic reference device, which may be a constant anchor delay).

In one or more example electronic devices, the predetermined time period is constant and/or common between the electronic device and at least one of the plurality of electronic reference devices. In one or more embodiments, the predetermined time period may be constant (such as a constant time period that may be known and used by the electronic device and a given electronic reference device).

In some embodiments, the predetermined time period may be constant and/or common for the electronic device and the plurality of electronic reference devices.

The predetermined time period may in some embodiments be set to zero.

In some embodiments, the predetermined time period may be constant and/or common for each pair formed by the electronic device and at least one of the plurality of electronic reference devices.

In one or more embodiments, the predetermined time period may be common for each set of electronic device and electronic reference device (for example, a first predetermined period for a first electronic reference device, a second predetermined period for a second electronic reference device, and/or a third predetermined period for a third electronic reference device, where the first predetermined period, the second predetermined period, and the third predetermined period are different, such as unique for each set of electronic device and electronic reference device). In other words, locally unique may be sufficient for separating second signals from different electronic reference devices locally in time windows. In one or more embodiments, the predetermined time period may be common for all sets (such as part of all of the plurality of sets) of electronic device and electronic reference device (for example a first predetermined period for a first electronic reference device, a second predetermined period for a second electronic reference device, and/or a third predetermined period for a third electronic reference device, such as where the first predetermined period, the second predetermined period, and the third predetermined period are the same and/or equivalent).

The processor circuitry 302 is configured to determine, based on each time of flight, distances between the electronic device and each electronic reference device of the plurality of electronic reference devices (such as less than all of the plurality of electronic reference devices, for example part of the plurality of electronic reference devices). The distances comprise a first distance, and a second distance.

The processor circuitry 302 is configured to obtain (such as via the interface circuitry 303, for example from a server, and/or from the memory circuitry 301), reference positions (such as a plurality of reference positions, for example N reference positions for N electronic reference devices) of the plurality of electronic reference devices. In other words, the processor circuitry 302 may be configured to retrieve reference positions (such as N reference positions) of the plurality of electronic reference devices.

Figure 7A:
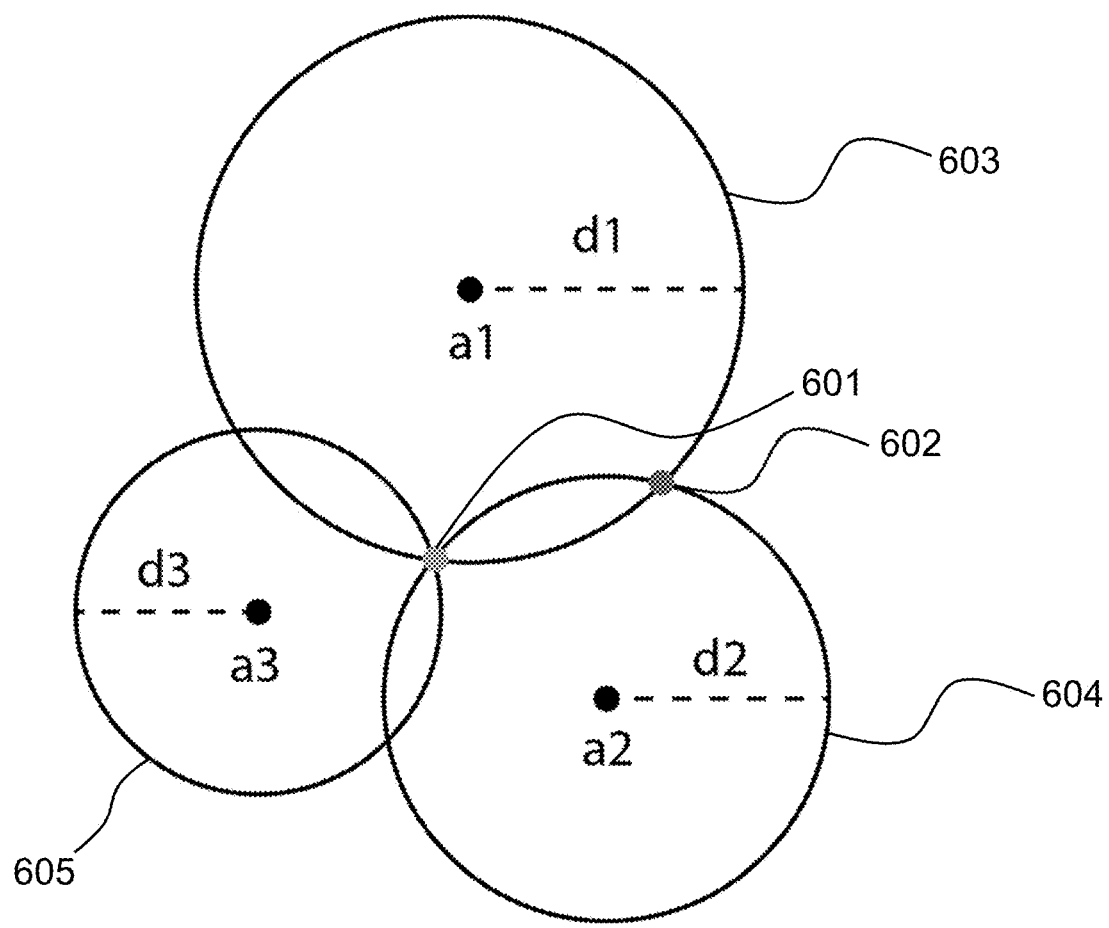
FIGS. 7A-7B are schematic representations of scenarios of determination of a position of an electronic device according to one or more embodiments of this disclosure.
Figure 7B:
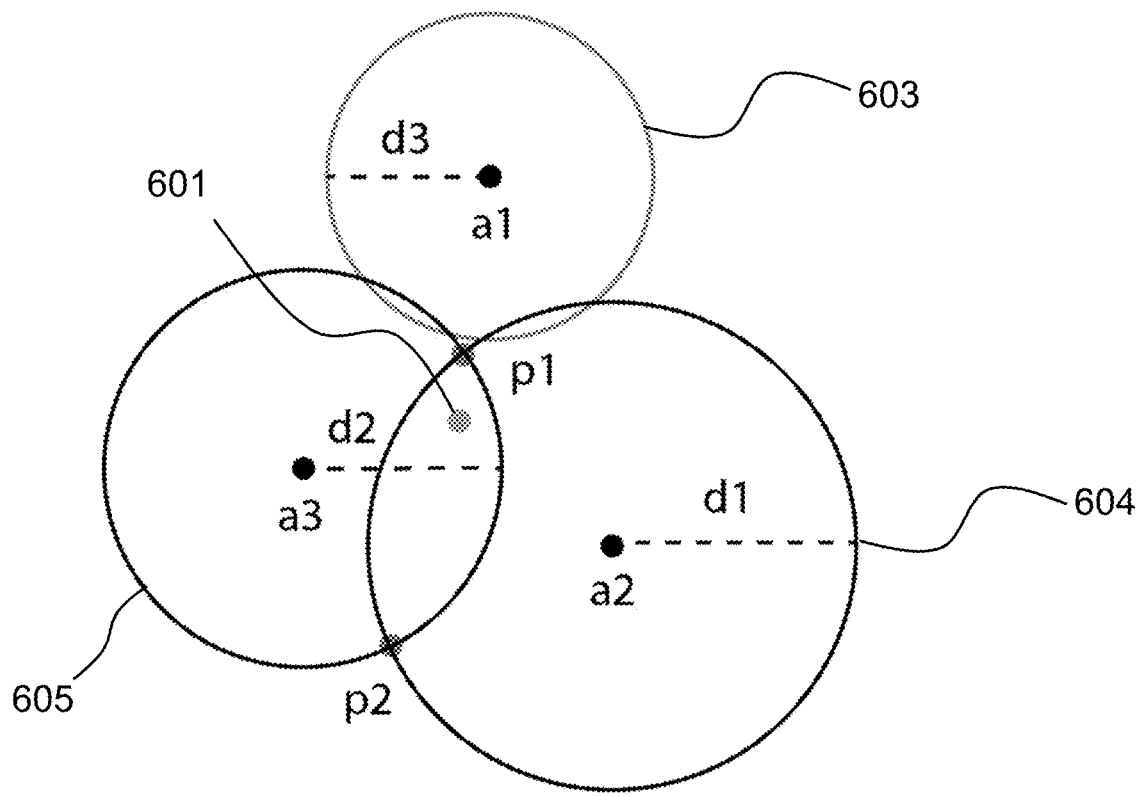

In one or more electronic devices, the processor circuitry 302 is configured to associate the first distance with a first candidate electronic reference device having one of the reference positions. In other words, the first distance is associated with the first candidate electronic reference device having one of the obtained reference positions. For example, the association may comprise selecting a first candidate anchor having a reference position to associate with the first distance (such as a first shortest distance to the electronic device), assuming that the selected first candidate anchor is the candidate anchor that gave the first distance, the correct position may be located at a corresponding distance to that anchor, such as on a circle with radius having a length corresponding to the first distance with center at the associated reference position (as illustrated in FIGS. 7A-B).

The processor circuitry 302 is configured to associate the second distance with a second candidate electronic reference device having one of the remaining reference positions (such as a one or more remaining reference positions, for example N−1 remaining reference positions). In other words, the second distance is associated with the second candidate electronic reference device having one of the remaining obtained reference positions. For example, the association comprises selecting a second candidate anchor having reference position, assuming that the second distance corresponds to the second candidate anchor having one of the remaining reference positions, the correct position may be located at a corresponding distance to that anchor, for example on a circle with radius having a length corresponding to the second distance with center at the associated reference position.

The processor circuitry 302 is configured to determine, based on the associations, the one or more candidate positions of the electronic device. In other words, based on the associations, one or more candidate positions are determined. For example, candidate electronic device positions can be selected, for example, when the second candidate anchor having one of the remaining reference positions corresponding with the second distance, the position of the electronic device (such as actual position of the electronic device) may also be located at a corresponding distance to the second candidate anchor.

In other words, for both selected candidate anchors having the associated reference positions to be correctly associated, the resulting position is to be located on both candidate anchor's corresponding distances, for example the circle with radius having a length corresponding to the first distance with center at the associated reference position of the first candidate electronic reference device and the circle with radius having a length corresponding to the second distance with center at the associated reference position of the second candidate electronic reference device is to overlap. In other words, when the second distance is successfully associated with the second candidate electronic reference device having the associated reference position, the number of possible positions is decreased to one or two positions.

In one or more embodiments, only the candidate anchors circles that are close enough to overlap with the first candidate anchor circle are possible as illustrated in FIGS. 7A-B (whereby the search is limited).

The processor circuitry 302 is configured to determine, based on the distances, one or more candidate positions, and the obtained reference positions, a position of the electronic device. Stated differently, the position of the electronic device is determined based on the distances, one or more candidate positions, and the obtained reference positions.

In one or more example electronic devices, when more than one candidate position of the electronic device is determined (as illustrated in FIG. 7A), the plurality of electronic reference devices comprises a third electronic reference device.

In one or more example electronic devices, the position of the electronic device is determined based on the electronic device configured to select (such as using the processor circuitry 302) one of the one or more candidate positions of the electronic device.

In one or more example electronic devices, the position of the electronic device is determined based on the electronic device configured to determine (such as, using the processor circuitry 302) whether a remaining distance corresponds to at least one of the remaining reference positions.

In one or more example electronic devices, the position of the electronic device is determined based on the electronic device configured to, when it is determined that the remaining distance corresponds to the at least one of the remaining reference positions, determine (such as using the processor circuitry 302) the position of the electronic device.

In other words, the remaining distances (for example N−2) may be associated (such as matched) with corresponding candidate electronic reference devices, which have to correspond to the one or more candidate positions, whereby the position of the electronic device may be determined.

In one or more example electronic devices, the processor circuitry 302 is configured to determine whether the one or more candidate positions satisfy a criterion. The criterion may comprise that the one or more candidate positions of the electronic device match with the distances associated with the candidate electronic reference devices, and the reference positions.

In one or more example electronic devices, the processor circuitry is configured to identify a conflict when it is not determined that the one or more candidate positions satisfy the criterion. In other words, for example, if no distances can (such as if any distances cannot) be associated (such as found) with candidate electronic reference devices (such as anchors) and no candidate positions of the electronic device can be determined, at any of the associating of the first distance with the first candidate electronic reference device having one of the reference positions, the associating of the second distance with the second candidate electronic reference device having one of the remaining reference positions, and the determining, based on the associations, of the one or more candidate positions of the electronic device, then a conflict may be identified. For example, this may be indicative of either that there has been no (correctly) associated (such as matched) distances and/or candidate electronic reference devices (such as anchors) and/or that a measurement error has occurred.

In one or more example electronic devices, the processor circuitry 302 is configured to iterate (such as iterating backwards), for each combinations of candidate electronic reference devices of the set, the operations: association the first distance and the second distance to respective candidate electronic reference devices having respective reference positions, and the determination of one or more candidate positions of the electronic device, the determination of the position of the electronic device based on the distances, the one or more candidate positions, and the obtained reference positions. In other words, associations and/or a search may be continued by replacing (such as changing the associated first electronic reference device and/or the associated second electronic reference device) a previously selected candidate electronic reference device (such as anchor) with another candidate electronic reference device one until a number of candidate electronic reference devices (such as a minimum number) have been associated (such as found, for example that sufficiently match) and/or until substantially all candidate electronic reference devices have been associated (such as search a whole tree of possible selections exhaustively) to a distance. For example, a best association (such as best match) and/or a first association (such as first match) that satisfies a criterion (such as a sufficient precision) are used to determine the position of the electronic device (such as a searched position). In other words, when each distance has at least one matching electronic reference device with no duplicates electronic reference device associated with the distances, a position of the electronic device has been determined based on the determined distances. For example, when a conflict is identified the processor circuitry may be configured to iterate for another candidate electronic reference device and/or iterate for another distance.

In one or more embodiments, to determine the position of the electronic device (for example finding a single first match more quickly), the electronic reference devices may be sorted in order of distances from the previous electronic device position (such as tag location), and selecting the first electronic reference device with having a reference position at the closest distance, first. It may for example be likely that the next electronic device position is close to previous electronic device position.

In one or more example electronic devices, the reference positions obtained correspond to one or more patterns of distribution of the plurality of electronic reference devices in space.

In one or more embodiment, the electronic reference devices when setting up a system of a plurality of electronic reference devices for positioning of electronic device should be located so that the likelihood of a match between measured distances at a false location is minimized. False matches may be undesired depending on where it is. In practice, the determination of a new position of the electronic device (use a new location) may often be determined based on information about the previous determined position.

A determined position (such as a match) far from the previously determined position during a short time period may be excluded (for example based on the speed that the electronic device has travelled from the first to second position).

For example, a distance may be measured by a straight line and/or a more likely path using map matching. In other words, in some cases incorrect determinations of positions close to the actual position of the electronic device may be more difficult to filter than incorrect determinations of positions further away from the actual position of the electronic device.

For example, it may be more likely to have several determinations of positions of the electronic device at almost the exact same location. This may be explained by the following example: on a position where N distances are associated with N electronic reference devices. When another electronic reference device outside of the already associated electronic reference devices is located on any of the received reference positions, there may be another association with a different set of electronic reference devices (i.e., a candidate electronic reference device may be replaced by another), which may be a possibility. Furthermore, this may in turn result in positions that are associated in clusters (such as small clusters). In turn, these clusters may be merged as a single position, because the position may be assumed to be equivalent.

In order to avoid some of the above detrimental effects, it may be possible to organise the plurality of electronic reference devices in patterns. It may therefore be advantageous to randomize locations of electronic reference devices. It may also be beneficial to have an even random distribution over the covered area. For example, instead of placing electronic reference devices at the same location in rows and columns over the plane, each electronic reference device may be shifted a distance randomly from its original location to give a random and evenly distributed coverage of electronic reference devices. This may improve the positioning of the electronic device.

The pattern for deploying or placing the electronic reference devices may depend for example on the actual building where it is deployed. In order to reduce the number of false positives, it may be desired to avoid distributing evenly the electronic reference devices, for example avoiding ordering in rows and columns with the same distance between them (such as one in each square of nearby electronic reference devices).

In one or more example electronic devices, the second signals are anonymous signals.

In one or more example electronic devices, the first signal is an anonymous signal.

The second signal may merely comprise an echo to the first signal without any identification of the electronic reference device sending the second signal. For example, the second signal may comprise a single-bit symbol (such as a single-bit of information). The second signals may be returned by the electronic reference devices after expiry of a predetermined time period (such as known by the electronic device), which may for example allow the second the signals to remain anonymous.

In one or more example electronic devices, each second signal comprises an identifier (such as local identity) of the corresponding electronic reference device acting as a sender of the second signal.

An advantage of each second signals comprising an identifier of the corresponding electronic reference device may be that the number of false positives may be reduced (such as filtering the reflections).

For example, an identifier (such as identity information) may be added bit by bit. For example, when 2-bit identities are used in all electronic reference devices, assuming that there are hundreds of electronic reference devices, the false positives may be reduced by a factor 4, because 3 out of 4 electronic reference devices may be excluded in the association by the electronic device. The window width for receiving the second signal may remain unaffected, for example the same.

The identifier may comprise local identities such as 4 bits (for example 16 identities) may be allocated by each electronic reference device, which is sent in the second signals (such as responses). For example, identifiers may be allocated (such as in a simple "cell planning") such that second signals (such as typical responses) from all positions may differ in identities. For example, second signals from different electronic reference devices may be possible to be separated in different groups and the first second signal received may be used as a reference (such as the correct line of sight distance).

An advantage of the second signals comprising identifier may be that receiving windows may be configured for the electronic device. In this way, the receiving window of the electronic device for receiving second signals may be increased (for example when the electronic reference devices are grouped in time).

In one or more example electronic devices, transmitting the first signal comprises transmitting a plurality of first signals. Each first signal comprises for example an identifier of the corresponding electronic reference device acting as a recipient of the first signal.

Transmitting a plurality of first signals wherein each first signal comprises an identifier of the corresponding electronic reference device acting as a recipient of the first signal, may allow distinguishing the electronic reference devices responding, for example by addressing a specific electronic reference device, by comprising an identifier (such a local identity) in each first signal (such as request message). Thereby, each electronic reference device may only respond when the first signal (such as request) corresponds (such as match) to the electronic reference device (such as corresponds to a local identity). For example, each electronic reference device may only have to be locally unique (such as 4 bits) to work.

In turn, the electronic device may transmit the plurality of first signals (such as requests) to the plurality of different electronic reference devices in several subsequent first signals.

When the electronic device transmits each first signal comprising an identifier of the corresponding electronic reference device, it may allow to allocate locally unique time slots where each electronic reference device may send their second signal in their own time slot. This may also allow to filter out echoes of second signals. For example, in a configuration with 16 time slots, each electronic reference device reachable from the electronic device position may have a unique local predetermined time period.

In some embodiments, the time slots allocated to respective electronic reference devices may be separated enough to avoid that a reflected second signal from one electronic reference device is received in the same time span as the direct second signal (such as line of sight response) from another electronic reference device. When a maximum distance between electronic device and electronic reference device is 30 m the maximum time of flight may be 200 ns (for UWB). For example, to provide that a previous second signal of electronic reference device does not collide with the next, second signals (such as responses) may be separated by 200 ns for example. In turn, that allows 16 different time slots where the electronic device may receive during 16×200 ns. Second signals from each electronic reference devices may thereby be grouped where the first second signal in each group may be the correct direct line of sight second signal (and not a reflection).

In one or more example electronic devices, the second signals are associated (such as using the processor circuitry 302) with one or more corresponding time stamps of reception.

Figure 4A:
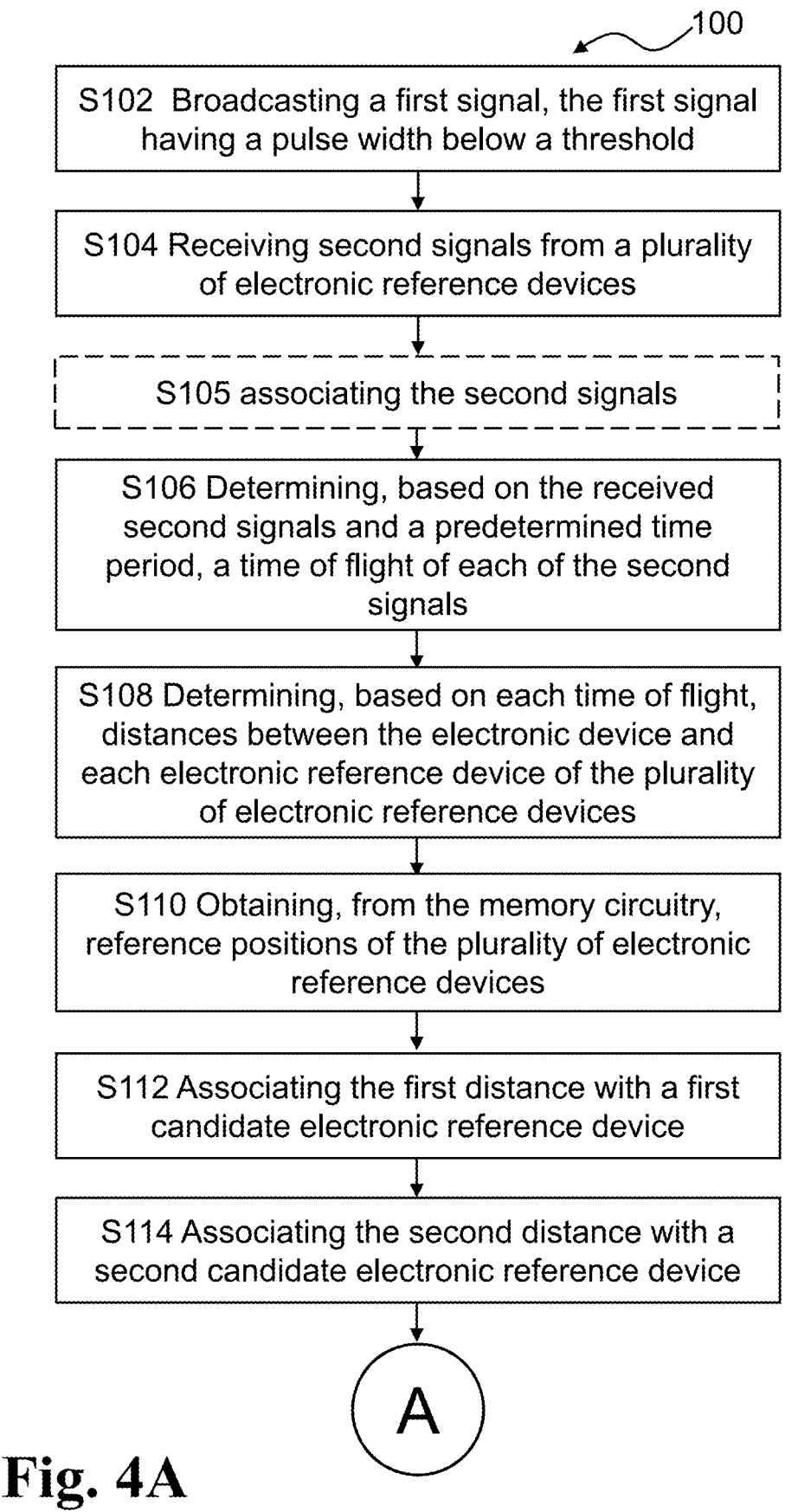
FIGS. 4A-4C depict a flow-chart illustrating an example method, performed in an electronic device, for determining a position of the electronic device according to this disclosure.
Figure 4B:
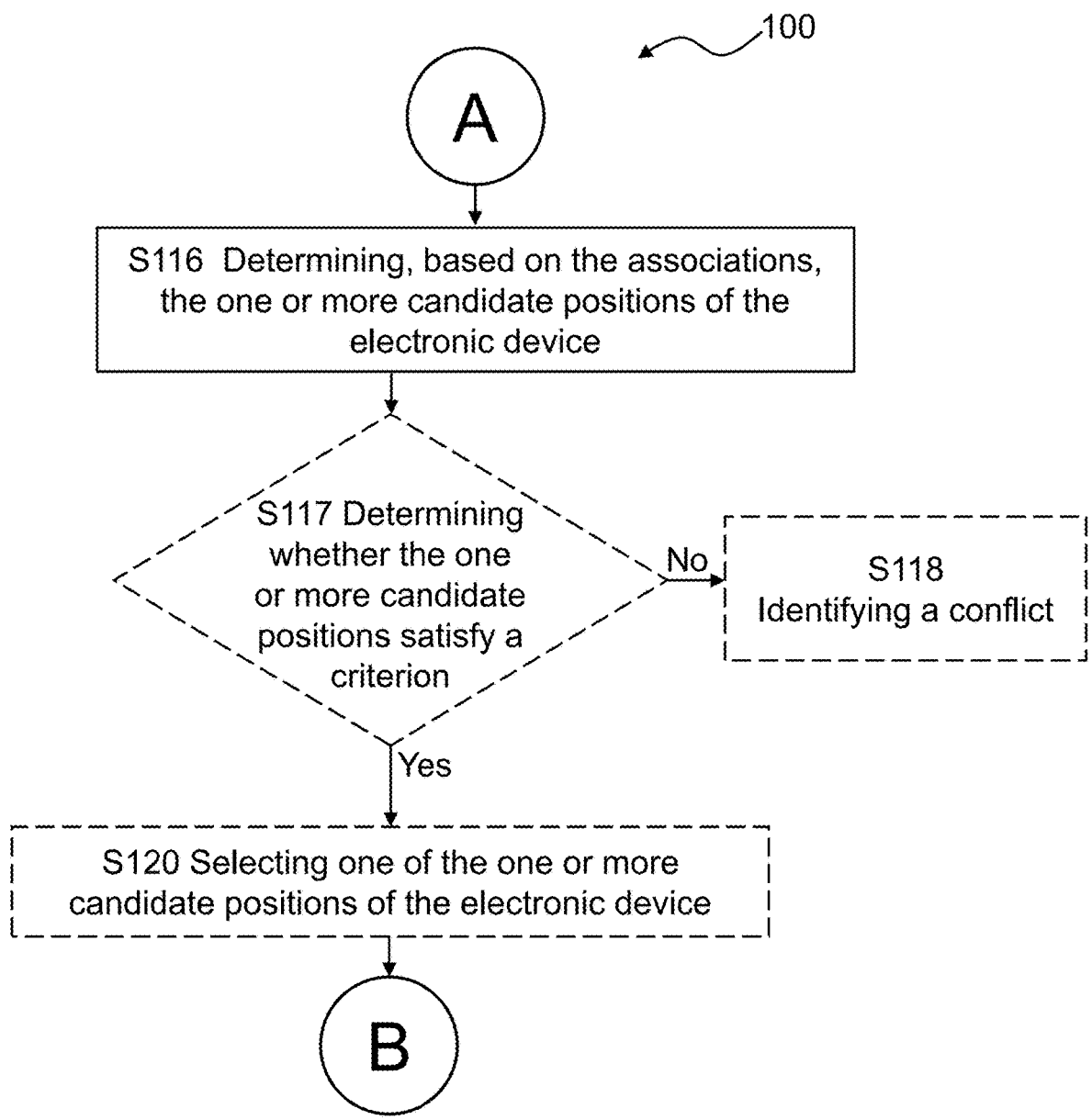
Figure 4C:
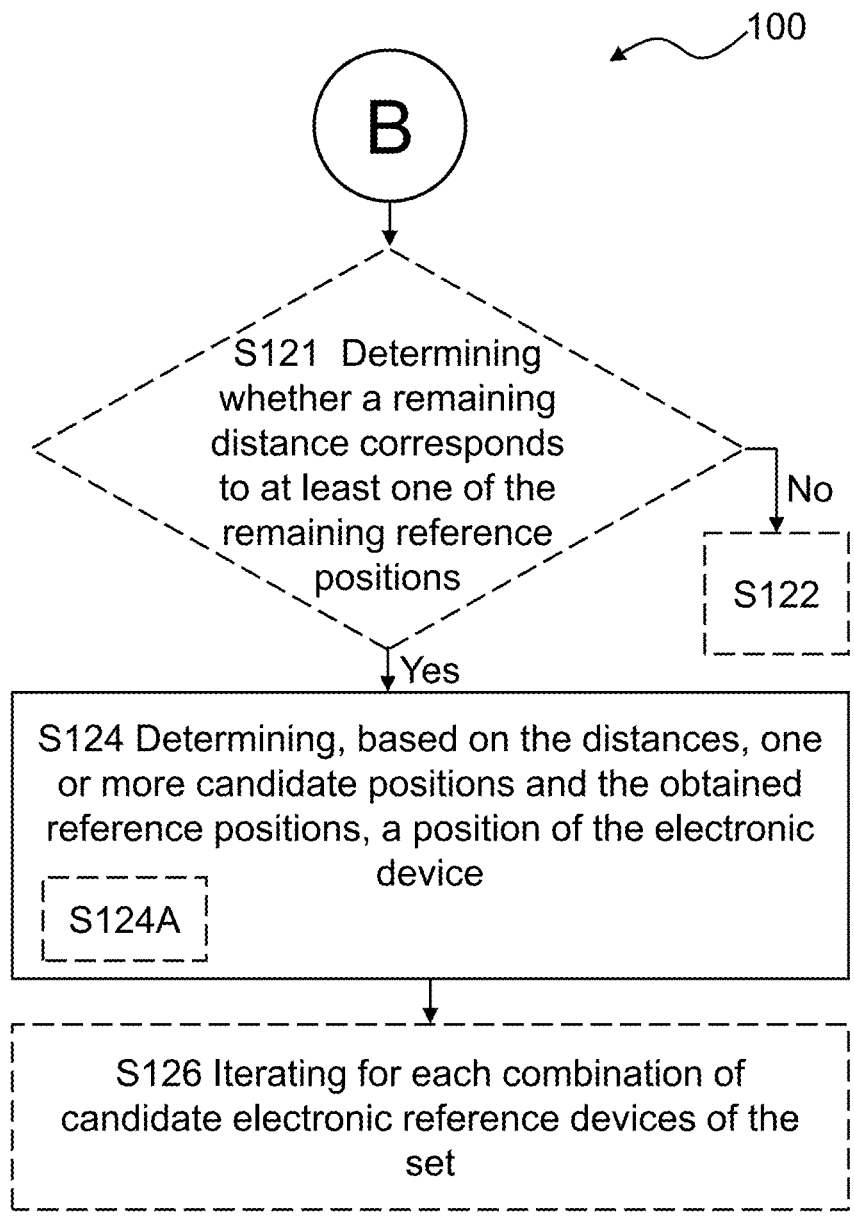

The electronic device 300 may be configured to perform any of the methods disclosed in FIGS. 4A, 4B, and 4C. In other words, the electronic device 300 may be configured for position determining of the electronic device 300.

The processor circuitry 302 is optionally configured to perform any of the operations disclosed in FIGS. 4A-4C (such as any one or more of S117, S118, S120, S121, S122, S124A, S126). The operations of the electronic device 300 may be embodied in the form of executable logic routines (for example, lines of code, software programs, etc.) that are stored on a non-transitory computer readable medium (for example, memory circuitry 301) and are executed by the processor circuitry 302).

Furthermore, the operations of the electronic device 300 may be considered a method that the electronic device 300 is configured to carry out. Also, while the described functions and operations may be implemented in software, such functionality may as well be carried out via dedicated hardware or firmware, or some combination of hardware, firmware and/or software.

Memory circuitry 301 may be one or more of a buffer, a flash memory, a hard drive, a removable media, a volatile memory, a non-volatile memory, a random access memory (RAM), or other suitable device. In a typical arrangement, memory circuitry 301 may include a non-volatile memory for long term data storage and a volatile memory that functions as system memory for processor circuitry 302. Memory circuitry 301 may exchange data with processor circuitry 302 over a data bus. Control lines and an address bus between memory circuitry 301 and processor circuitry 302 also may be present (not shown in FIG. 2). Memory circuitry 301 is considered a non-transitory computer readable medium.

Memory circuitry 301 may be configured to store information (such as information indicative of the reference positions, the distances, the electronic reference devices, the candidate positions of the electronic device, the first signals, and/or the second signals) in a part of the memory.

Figure 3:
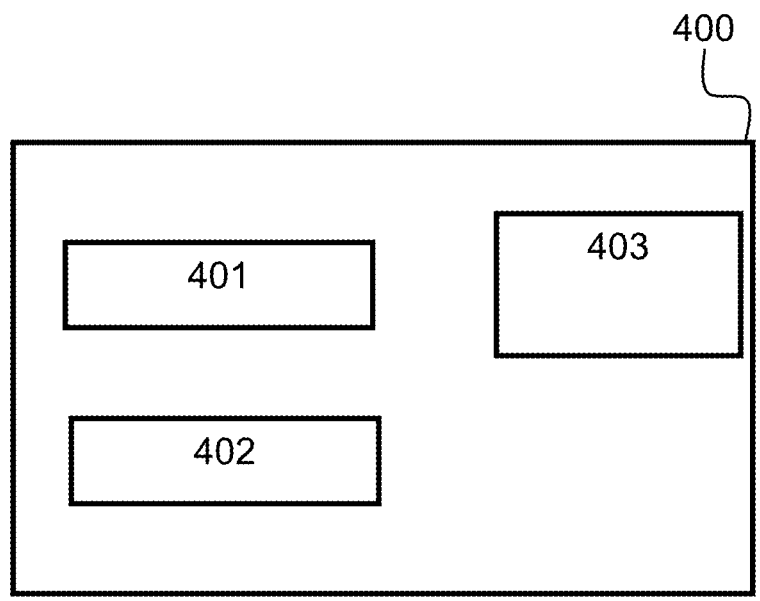
FIG. 3 is a block diagram illustrating an example electronic reference device according to this disclosure.

FIG. 3 is a block diagram illustrating an example electronic reference device 400 according to one or more embodiments of the present disclosure.

The electronic reference device 400 comprises memory circuitry 401, processor circuitry 402, and interface circuitry 403. The electronic reference device may comprise an anchor device, such as an anchor configured in a system with an electronic device and one or more other anchors, for positioning the electronic device.

Figure 5:
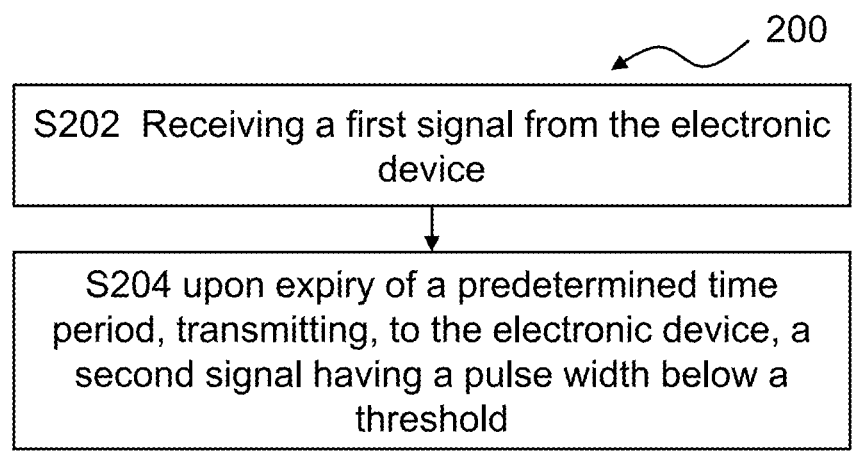
FIG. 5 is a flow-chart illustrating an example method, performed in an electronic reference device, for assisting a determining of a position of an electronic device according to this disclosure.

The electronic reference device 400 may be configured to perform any of the methods disclosed in FIG. 5. In other words, the electronic device 400 may be configured for assisting a determining of a position of an electronic device.

The processor circuitry 402 is configured to receive (such as via the interface circuitry 403) a first signal from an electronic device, such as the electronic device disclosed herein.

The processor circuitry 402 is configured to, upon expiry of at least one predetermined time period, transmit (such as via the interface circuitry 403), to the electronic device, a second signal having a pulse width below a threshold.

In one or more example electronic reference devices, the threshold provides an upper limit to the pulse width of the second signal, the upper limit being 10 ns.

The second signal may comprise an identifier of the electronic reference device.

The first signal may comprise an identifier of the electronic reference device an identifier of the corresponding electronic reference device acting as a recipient of the first signal.

The operations of the electronic device 400 may be embodied in the form of executable logic routines (for example, lines of code, software programs, etc.) that are stored on a non-transitory computer readable medium (for example, memory circuitry 401) and are executed by the processor circuitry 402).

Furthermore, the operations of the electronic device 400 may be considered a method that the electronic device 400 is configured to carry out. Also, while the described functions and operations may be implemented in software, such functionality may as well be carried out via dedicated hardware or firmware, or some combination of hardware, firmware and/or software.

Memory circuitry 401 may be one or more of a buffer, a flash memory, a hard drive, a removable media, a volatile memory, a non-volatile memory, a random access memory (RAM), or other suitable device. In a typical arrangement, memory circuitry 401 may include a non-volatile memory for long term data storage and a volatile memory that functions as system memory for processor circuitry 402. Memory circuitry 401 may exchange data with processor circuitry 402 over a data bus. Control lines and an address bus between memory circuitry 401 and processor circuitry 402 also may be present (not shown in FIG. 3). Memory circuitry 401 is considered a non-transitory computer readable medium.

Memory circuitry 401 may be configured to store information (such as information indicative of the reference positions, the distances, the electronic reference devices, the candidate positions of the electronic device, the first signals, and/or the second signals) in a part of the memory.

FIG. 4A-4C shows a flow-chart illustrating an example method 100 performed by an electronic device, for determining a position of the electronic device (such as the electronic device disclosed herein, such as the electronic device 300 of FIGS. 1 and 2).

The method 100 comprises broadcasting S102 a first signal, the first signal having a pulse width below a threshold.

The method 100 comprises receiving S104 second signals from a plurality of electronic reference devices comprising a first electronic reference device, and a second electronic reference device, determining S106, based on the received second signals and at least one predetermined time period, a time of flight of each of the second signals.

The method 100 comprises determining S108, based on each time of flight, distances between the electronic device and each electronic reference device of the plurality of electronic reference devices, the distances comprising a first distance, and a second distance.

The method 100 comprises obtaining S110, from the memory circuitry, reference positions of the plurality of electronic reference devices.

The method 100 comprises associating S112 the first distance with a first candidate electronic reference device having one of the reference positions.

The method 100 comprises associating S114 the second distance with a second candidate electronic reference device having one of the remaining reference positions.

The method 100 comprises determining S116, based on the associations, the one or more candidate positions of the electronic device.

The method 100 comprises determining S124, based on the distances, one or more candidate positions and the obtained reference positions, a position of the electronic device.

In one or more example methods, the at least one predetermined time period is constant and/or common between the electronic device and at least one of the plurality of electronic reference devices.

In one or more example methods, the threshold provides an upper limit to the pulse width of the first signal, the upper limit being 10 ns.

In one or more example methods, the first signal and/or the second signal comprises a single-bit symbol.

In one or more example methods, the method comprises selecting S120 one of the one or more candidate positions of the electronic device.

In one or more example methods, the method comprises determining S121 whether a remaining distance corresponds to at least one of the remaining reference positions.

In one or more example methods, the method comprises, when it is determined that the remaining distance corresponds to at least one of the remaining reference positions, determining S124A the position of the electronic device.

In one or more example methods, the method comprises, when it is not determined that the remaining distance corresponds to at least one of the remaining reference positions, repeating the steps from S112 for other candidate electronic devices. In one or more example methods, the method comprises iterating S126 for each combination of candidate electronic reference devices of the set, the operations association the first distance and the second distance to respective candidate electronic reference devices having respective reference positions, and the determination of one or more candidate positions of the electronic device, the determination of the position of the electronic device based on the distances, the one or more candidate positions, and the obtained reference positions.

In one or more example methods, the first signal comprises a request for response to the first signal.

In one or more example methods, the method comprises determining S117 whether the one or more candidate positions satisfy a criterion.

In one or more example methods, the method comprises identifying S118 a conflict when it is not determined that the one or more candidate positions satisfy the criterion. For example, when a conflict is identified the method may proceed to step S126 by iterating for another candidate electronic reference device.

In one or more example methods, the method comprises performing step S120 when it is determined that the one or more candidate positions satisfy the criterion.

In one or more example methods, the reference positions obtained correspond to one or more patterns of distribution of the plurality of electronic reference devices in space.

In one or more example methods, the second signals are anonymous signals.

In one or more example methods, the method comprises associating S105 the second signals with one or more corresponding time stamps of reception.

FIG. 5 shows a flow-chart illustrating an example method 200 performed in an electronic reference device (such as the electronic reference device disclosed herein, such as the electronic reference device 400, 400A-H of FIGS. 1 and 3), for assisting a determining of a position of an electronic device (such as the electronic device disclosed herein, such as the electronic device 300 of FIGS. 1 and 2).

The method 200 comprises receiving S202 a first signal from the electronic device.

The method 200 comprises, upon expiry of at least one predetermined time period, transmitting S204, to the electronic device, a second signal having a pulse width below a threshold.

Figure 6:
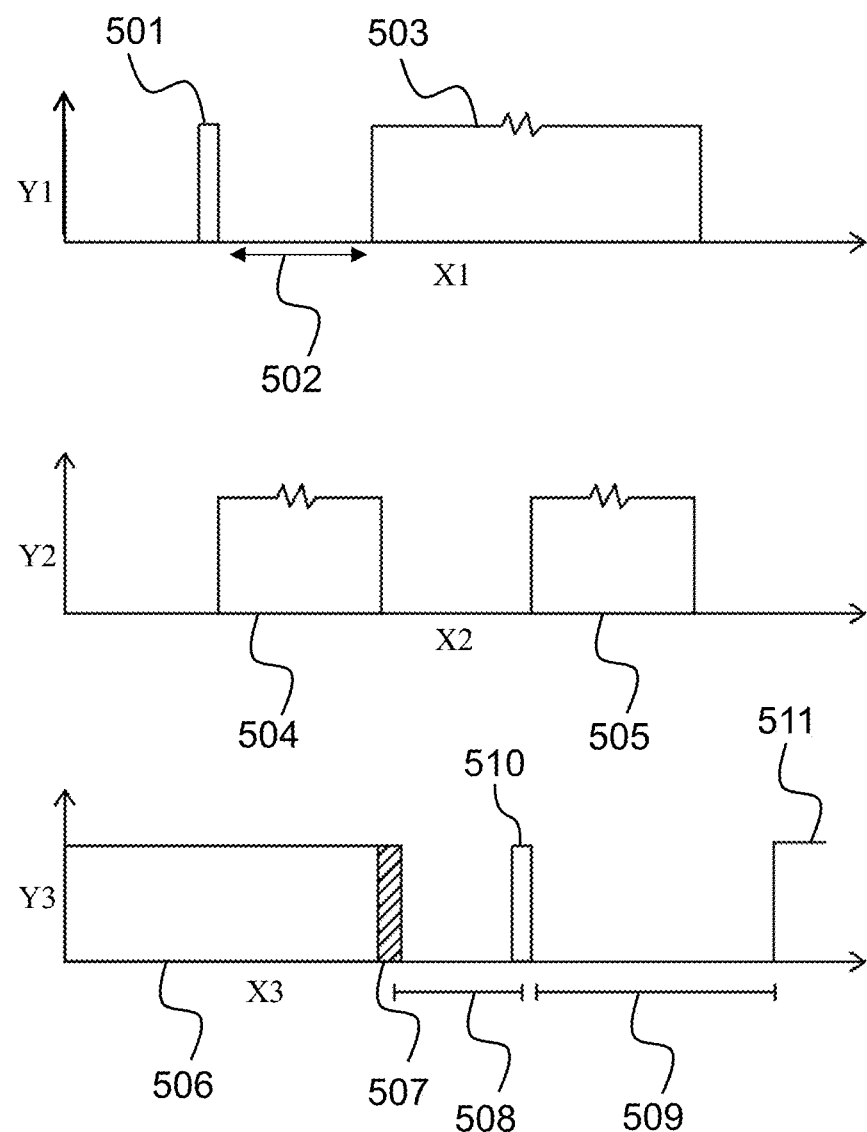
FIG. 6 is a schematic representation of example communication of signals and activity at an electronic device, and at an electronic reference device according to one or more embodiments of this disclosure.

FIG. 6 shows schematic representations of example communications of signals and activity at an electronic device, and at an electronic reference device according to one or more embodiments of this disclosure (for example an overview of relative timing in electronic device, electronic reference device, and signal during flight).

The upper illustrative graph (Y1, X1) is a schematic example where the disclosed technique is applied, seen from the perspective of the electronic device. Y1 is a schematic representation indicative of communication of the electronic device on this axis. X1 is indicative of time. The electronic device transmits a first signal 501 to a plurality of electronic reference devices. The first signal may for example have a pulse width of 2 ns at a frequency of 500 MHz (such as having a channel ranging between 3244.8 to 3744 MHz) and/or comprise a single-bit symbol. The electronic device may then optionally be configured to be inactive (such as go to sleep) for the predetermined time period 502 (such as known anchor delay), such as waiting for the electronic reference devices to echo the first signal. The electronic device may then receive 503 (such as listen) second signals from the plurality of electronic reference devices (for example having one or more receiving windows). The electronic device may for example be configured to receive 503 for the maximum round trip time of flight travel time, such as 200 ns (such as for 60 m using Ultra Wideband, UWB).

The middle illustrative graph (Y2, X2) is a schematic example where the disclosed technique is applied, seen from the perspective of the time of flight. Y2 is a schematic representation indicative (for illustrative purposes) of the time of flight (such as, during which time period a signal moves, or propagates between devices). X2 is indicative of time. The time of flight of the transmitted first signal 504 is shown. In this example, time of flight of the transmitted first signal 504 may be below 100 ns for a distance below 30 m. The time of flight of the received second signals 505 is shown. In this example, time of flight of the received second signal 505 may be below 100 ns for a distance below 30 m.

The bottom illustrative graph (Y3, X3) is a schematic example where the disclosed technique is applied, seen from the perspective of the electronic reference device. Y3 is a schematic representation indicative of communication of the electronic reference device on this axis from the perspective of the electronic reference device (such as a timing diagram). X3 is indicative of time. The electronic reference device is in receiving state 506 and receives 507 the first signal 501 from the electronic device. For example, the electronic reference device may be configured to continuously receive (such as listen) for first signals (such as anonymous or identified signals, for example single-bit messages). The electronic reference device is configured to, upon expiry of at least one predetermined time period 508 (such as constant anchor delay), to transmit to the electronic device, a second signal 510 having a pulse width below a threshold. The electronic reference device may then be configured to be inactive (such as go to sleep, for example to avoid collisions of signals) for a period of time 509. The electronic reference device may then go back to being in receiving state 511, for example for the receiving the next first signal.

FIG. 7A-B are schematic representations of scenarios of determination of a position of an electronic device according to one or more embodiments of this disclosure.

Figure 8:
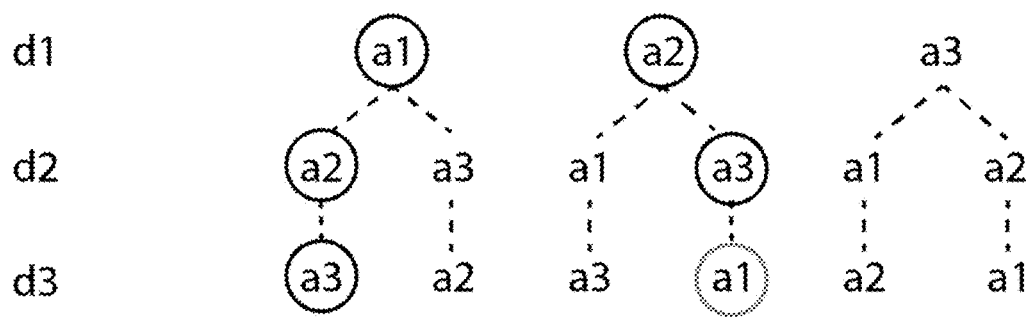
FIG. 8 is a schematic representation of an association of distances with candidate electronic devices according to one or more embodiments of this disclosure.

In FIG. 8, a schematic representation of a scenario of an association of distances with candidate electronic devices is illustrated (such as a simplified visualization of one search tree, where all possible combinations of distances and electronic reference devices are illustrated).

FIGS. 7A-B and FIG. 8 show illustrative examples where the disclosed technique is applied, where a first distance d1 determined is associated with a first candidate electronic reference device having reference position a1 obtained (for example, a first distance d1 determined is selected and a first candidate anchor having reference position a1 is assumed to match a current tag location and first distance d1).

A second distance d2 is associated with a second candidate electronic reference device having reference position a2 of the remaining obtained reference positions (for example, a second distance d2 is selected and a second candidate anchor having reference position a2 is assumed to match a current tag location, the first distance d1, the first candidate anchor having reference position a1, and the second distance d2).

In other words, a second distance d2 is associated with a second candidate electronic reference device having reference position a2 (such as a2 being one of the remaining obtained reference positions, for example selecting a second candidate anchor having reference position a2, assuming that the second distance d2 corresponds to the second candidate anchor having reference position a2, the correct position may be located at a corresponding distance d2 to that anchor. i.e., on a circle 604 with radius d2 with center at a2 reference position).

In FIG. 7A, a successful determination of a position of an electronic device is illustrated (such as an example of a successful match, for example mapped spatially). As can be seen the circles 603 and 604 of d1, a1 and d2, a2 are crossing in two candidate positions 601 and 602 of the electronic device, and the circle 605 of a3, d3 is crossing the other two circles 603, 604 in the point 601. The position of the electronic device is therefore determined to be 601 and is also the actual position of the electronic device. The determination has therefore been successful in that illustrative example. In other words, reference positions a1, a2, and a3 matched the distances d1, d2, and d3.

In other words, a first distance d1 is associated with a first candidate electronic reference device having reference position a1 (for example, selecting a first candidate anchor having reference position a1 to associate the first distance d1 (such as a first shortest distance to the electronic device), assuming that the selected first candidate anchor a1 is the candidate anchor that gave the first distance d1, the correct position may be located at a corresponding distance d1 to that anchor. i.e., on a circle 603 with radius d1 with center at a1 reference position).

Based on the associations, one or more candidate positions are determined (such as selecting candidate electronic device positions, for example, when the second candidate anchor having reference position a2 corresponds with second distance d2, the position of the electronic device (such as actual position of the electronic device) may also be located at a corresponding distance to the second candidate anchor).

In other words, for both selected candidate anchors having the reference positions a1 and a2 to be correctly associated, the resulting position is to be located on both candidate anchor's corresponding distances i.e., the circles 603 and 604 is to overlap. In one or more embodiments, only the candidate anchors circles that are close enough to overlap with the first candidate anchor circle will be possible (whereby the search will be limited).

When the second distance d2 is successfully associated with the second candidate electronic reference device having the reference position a2 the number of possible positions is decreased to one or two positions 601 and 602 as can be seen in FIG. 7A.

A third distance d3 is associated with a third candidate electronic reference device a3 having one of the remaining obtained reference positions (for example, a third distance d3 is selected and a third candidate anchor a3 that is assumed to correspond to the third distance d3). In other words, for the selected third candidate anchor a3 to be correctly associated, the resulting position is to be located on both the first candidate anchor and second candidate anchor's corresponding distances i.e., the circle 605 is to overlap with the circles 603 and 604 in one common point 601 (such as a candidate target position that matches with the three selected anchors).

Based on the distances d1, d2, d3, one or more reference positions a1, a2, a3, and the obtained reference positions, a position 601 of the electronic device is determined as illustrated in FIG. 7A.

In FIG. 7B, an unsuccessful determination of a position of an electronic device is illustrated (such as an example of a failed match). As can be seen the circles 604 and 605 of d1, a2 and d2, a3 are crossing in two candidate positions p1 and p2 of the electronic device, but the circle 603 of a1, d3 is not crossing the other two circles in any of p1 or p2. The actual position of the electronic device is 601, which has not been determined in this example. In other words, reference positions a2 and a3 matched the distances d1 and d2, but reference position a1 did not match the distance d3.

The following simulation results are examples where the disclosed technique is applied. The example simulation was performed for an area of 100*100 m with approximately 120 electronic reference devices randomly distributed over the area. The following parameters were used:
 area size 100×100 m
 electronic reference devices are spread out every 10 m with randomness of 4×4 m from the center point of the electronic reference device
 the total number of electronic reference devices 121
 the maximum distance between electronic device and electronic reference device (such as range) is 20 m
 the total number of determined distances between the electronic device and each of the electronic reference device is 6 (the distances to 6 electronic reference devices are determined by the electronic device)
 the maximum distance measurement error is +/−0.2 m (for example, this means that the electronic device may associate a distance to a candidate electronic reference device if it is within +/−0.2 m of measured distance)
The simulation was performed as follows:
 121 electronic reference devices are first randomly placed as described above
 a random position for the electronic device in 100×100 m area is selected
 the distances to the 6 closest electronic reference devices from the random position of the electronic device are determined
 the determined distances are associated with the obtained reference position (for example matched against all possible reference positions).

The result of the simulation from 500 iterations, with the above configuration of 121 electronic reference devices with different random positions resulted in the following:
 203 out of 500 determined only one position of the electronic device
 145 out of 500 determined two positions of the electronic device
 64 out of 500 determined three positions of the electronic device The figures are schematic and simplified for clarity, and they merely show details which aid understanding the disclosure, while other details have been left out. Throughout, the same reference numerals are used for identical or corresponding parts.

Embodiments of methods and products (electronic devices and electronic reference devices) according to the disclosure are set out in the following items:

Item 1. An electronic device (300) comprising:
 memory circuitry (301);
 interface circuitry (303); and
 processor circuitry (302);
 wherein the processor circuitry (302) is configured to:
  transmit, to a plurality of electronic reference devices, a first signal, the first signal having a pulse width below a threshold;
  receive second signals from the plurality of electronic reference devices comprising a first electronic reference device, and a second electronic reference device;
  determine, based on the received second signals and at least one predetermined time period, a time of flight of each of the second signals;
  determine, based on each time of flight, distances between the electronic device and each electronic reference device of the plurality of electronic reference devices, the distances comprising a first distance, and a second distance;
  obtain, reference positions of the plurality of electronic reference devices;
  associate the first distance with a first candidate electronic reference device having one of the reference positions;
  associate the second distance with a second candidate electronic reference device having one of the remaining reference positions;
  determine, based on the associations, one or more candidate positions of the electronic device; and
  determine, based on the distances, the one or more candidate positions, and the obtained reference positions, a position of the electronic device.

Item 2. The electronic device according to item 1, wherein the at least one predetermined time period is constant and/or common between the electronic device and at least one of the plurality of electronic reference devices.

Item 3. The electronic device according to any of items 1-2, wherein the threshold provides an upper limit to the pulse width of the first signal, the upper limit being 10 ns.

Item 4. The electronic device according to any of items 1-3, wherein the first signal and/or the second signal comprises a single-bit symbol.

Item 5. The electronic device according to any of the preceding items, wherein the position of the electronic device is determined based on the electronic device configured to:

select one of the one or more candidate positions of the electronic device;
determine whether a remaining distance corresponds to at least one of the remaining reference positions, and
when it is determined that the remaining distance corresponds to the at least one of the remaining reference positions, determine the position of the electronic device.

Item 6. The electronic device according to any of the preceding items, wherein the first signal comprises a request for response to the first signal.

Item 7. The electronic device according to any of the preceding items, wherein the processor circuitry is configured to:
determine whether the one or more candidate positions satisfy a criterion, and
identify a conflict when it is not determined that the one or more candidate positions satisfy the criterion.

Item 8. The electronic device according to item 7, wherein the processor circuitry is configured to iterate, for all combinations of candidate electronic reference devices of the set, the operations association the first distance and the second distance to respective candidate electronic reference devices having respective reference positions, and the determination of one or more candidate positions of the electronic device, the determination of the position of the electronic device based on the distances, the one or more candidate positions, and the obtained reference positions.

Item 9. The electronic device according to any of the preceding items, wherein the reference positions obtained correspond to one or more patterns of distribution of the plurality of electronic reference devices in space.

Item 10. The electronic device according to any of the preceding items, wherein the second signals are anonymous signals.

Item 11. The electronic device according to any of items 1-9, wherein each second signal comprises an identifier of the corresponding electronic reference device acting as a sender of the second signal.

Item 12. The electronic device according to any of items 1-9, wherein transmitting the first signal comprises transmitting a plurality of first signals wherein each first signal comprises an identifier of the corresponding electronic reference device acting as a recipient of the first signal.

Item 13. The electronic device according to any of the preceding items, wherein the second signals are associated with one or more corresponding time stamps of reception.

Item 14. An electronic reference device (400) comprising:
memory circuitry (401);
interface circuitry (403); and
processor circuitry (402);
wherein the processor circuitry (402) is configured to:
receive a first signal from an electronic device,
upon expiry of at least one predetermined time period, transmit, to the electronic device, a second signal having a pulse width below a threshold.

Item 15. The electronic reference device according to item 14, wherein the threshold provides an upper limit to the pulse width of the second signal, the upper limit being 10 ns.

Item 16. A method, performed in an electronic device, for determining a position of the electronic device, the method comprising:
transmitting (S102), to a plurality of electronic reference devices, a first signal, the first signal having a pulse width below a threshold;
receiving (S104) second signals from the plurality of electronic reference devices comprising a first electronic reference device, and a second electronic reference device;
determining (S106), based on the received second signals and at least one predetermined time period, a time of flight of each of the second signals;
determining (S108), based on each time of flight, distances between the electronic device and each electronic reference device of the plurality of electronic reference devices, the distances comprising a first distance, and a second distance;
obtaining (S110), from the memory circuitry, reference positions of the plurality of electronic reference devices;
associating (S112) the first distance with a first candidate electronic reference device having one of the reference positions;
associating (S114) the second distance with a second candidate electronic reference device having one of the remaining reference positions;
determining (S116), based on the associations, one or more candidate positions of the electronic device; and
determining (S124), based on the distances, the one or more candidate positions and the obtained reference positions, a position of the electronic device.

Item 17. The method according to item 16, wherein the at least one predetermined time period is constant and/or common between the electronic device and at least one of the plurality of electronic reference devices.

Item 18. The method according to any of items 16-17, wherein the threshold provides an upper limit to the pulse width of the first signal, the upper limit being 10 ns.

Item 19. The method according to any of items 16-18, wherein the first signal and/or the second signal comprises a single-bit symbol.

Item 20. The method according to any of items 16-19, the method comprising:
selecting (S120) one of the one or more candidate positions of the electronic device;
determining (S121) whether a remaining distance corresponds to at least one of the remaining reference positions, and
when it is determined that the remaining distance corresponds to at least one of the remaining reference positions, determining (S124A) the position of the electronic device.

Item 21. The method according to any of items 16-20, wherein the first signal comprises a request for response to the first signal.

Item 22. The method according to any of items 16-21, the method comprising:
determining (S117) whether the one or more candidate positions satisfy a criterion, and
identifying (S118) a conflict when it is not determined that the one or more candidate positions satisfy the criterion.

Item 23. The method according to any of items 16-22, the method comprising:
iterating (S126) for each combination of candidate electronic reference devices of the set, the operations of association of the first distance and the second distance to respective candidate electronic reference devices having respective reference positions, and the determination of one or more candidate positions of the electronic device, the determination of the position of the electronic device based on the distances, the one or more candidate positions, and the obtained reference positions.

Item 24. The method according to any of items 16-23, wherein the reference positions obtained correspond to one or more patterns of distribution of the plurality of electronic reference devices in space.

Item 25. The method according to any of items 16-24, wherein the second signals are anonymous signals.

Item 26. The method according to any of items 16-24, wherein each second signal comprises an identifier of the corresponding electronic reference device acting as a sender of the second signal.

Item 27. The method according to any of items 16-24, wherein transmitting the first signal comprises transmitting a plurality of first signals wherein each first signal comprises an identifier of the corresponding electronic reference device acting as a recipient of the first signal.

Item 28. The method according to any of items 16-25, the method comprising:
associating (S105) the second signals with one or more corresponding time stamps of reception.

Item 29. A method, performed in an electronic reference device, for assisting a determining of a position of an electronic device, the method comprising:
receiving (S202) a first signal from the electronic device, and
upon expiry of at least one predetermined time period, transmitting (S204), to the electronic device, a second signal having a pulse width below a threshold.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that FIGS. 1-8 comprises some circuitries or operations which are illustrated with a solid line and some circuitries or operations which are illustrated with a dashed line. Circuitries or operations which are comprised in a solid line are circuitries or operations which are comprised in the broadest example embodiment. Circuitries or operations which are comprised in a dashed line are example embodiments which may be comprised in, or a part of, or are further circuitries or operations which may be taken in addition to circuitries or operations of the solid line example embodiments. It should be appreciated that these operations need not be performed in order presented. Furthermore, it should be appreciated that not all of the operations need to be performed. The example operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the example embodiments may be implemented at least in part by means of both hardware and software, and that several "means", "units" or "devices" may be represented by the same item of hardware.

The various example methods, devices, nodes and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly, to be regarded in an illustrative rather than restrictive sense. The claimed disclosure is intended to cover all alternatives, modifications, and equivalents.

What is claimed is:

1. An electronic device comprising:
memory circuitry;
interface circuitry; and
processor circuitry;
wherein the processor circuitry is configured to:
transmit, to a plurality of electronic reference devices, a first signal, the first signal having a pulse width below a threshold;
receive a plurality of second signals from the plurality of electronic reference devices comprising original second signals from each of the plurality of electronic reference devices and reflections of the original second signals;
filter the reflections of the original second signals from the plurality of second signals leaving filtered received second signals;
determine a round-trip time of the filtered received second signals;
determine, based on the round-trip time of the filtered received second signals and at least one predetermined time period, a time of flight of each of the filtered second signals;
determine, based on each time of flight, distances between the electronic device and each electronic reference device of the plurality of electronic reference devices, the distances comprising a first distance, and a second distance;
obtain, reference positions of the plurality of electronic reference devices;
associate the first distance with a first candidate electronic reference device having one of the reference positions;
associate the second distance with a second candidate electronic reference device having one of the remaining reference positions;
determine, based on the associations, one or more candidate positions of the electronic device; and
determine, based on the distances, the one or more candidate positions, and the obtained reference positions, a position of the electronic device.

2. The electronic device according to claim 1, wherein the processor circuitry is configured to:
determine a different predetermined time period for each of the plurality of electronic reference devices according to:

$k*$(anchor delay), wherein k is an integer unique to each of the plurality of electronic reference devices,
wherein (anchor delay) is a constant time period,
whereby the plurality of second signals are received by the electronic device from each of the plurality of electronic reference devices at times spaced apart by the anchor delay.

3. The electronic device according to claim 1, wherein the threshold provides an upper limit to the pulse width of the first signal, the upper limit being 10 ns.

4. The electronic device according to claim 1, wherein the first signal and/or the filtered received second signals comprise a single-bit symbol.

5. The electronic device according to claim 1, wherein the position of the electronic device is determined based on the electronic device configured to:
select one of the one or more candidate positions of the electronic device;
determine whether a remaining distance corresponds to at least one of the remaining reference positions, and
when it is determined that the remaining distance corresponds to the at least one of the remaining reference positions, determine the position of the electronic device.

6. The electronic device according to claim 1, wherein the first signal comprises a request for response to the first signal.

7. The electronic device according to claim 1, wherein the processor circuitry is configured to:
determine whether the one or more candidate positions satisfy a criterion, and
identify a conflict when it is not determined that the one or more candidate positions satisfy the criterion.

8. The electronic device according to claim 7, wherein the processor circuitry is configured to iterate, for all combinations of candidate electronic reference devices of the set, the operations association the first distance and the second distance to respective candidate electronic reference devices having respective reference positions, and the determination of one or more candidate positions of the electronic device, the determination of the position of the electronic device based on the distances, the one or more candidate positions, and the obtained reference positions.

9. The electronic device according to claim 1, wherein the reference positions obtained correspond to one or more patterns of distribution of the plurality of electronic reference devices in space.

10. The electronic device according to claim 1, wherein the filtered second signals are anonymous signals.

11. The electronic device according to claim 1, wherein each filtered second signal comprises an identifier of the corresponding electronic reference device acting as a sender of the second signal.

12. The electronic device according to claim 1, wherein transmitting the first signal comprises transmitting a plurality of first signals wherein each first signal comprises an identifier of the corresponding electronic reference device acting as a recipient of the first signal.

13. The electronic device according to claim 1, wherein the filtered second signals are associated with one or more corresponding time stamps of reception.

14. The electronic device according to claim 1, wherein:
processor circuitry is further configured to:
transition the electronic device to be in an inactive sleep state during time periods defined by an anchor delay between times spaced apart by the anchor delay that the plurality of second signals are received by the electronic device from each of the plurality of electronic reference devices.

15. An electronic reference device operable in a system comprising an associated electronic device and a plurality of other electronic reference devices, the electronic reference device comprising:
memory circuitry;
interface circuitry; and
processor circuitry;
wherein the processor circuitry is configured to:
receive a first signal from the associated electronic device, and
upon expiry of at least one predetermined anchor delay time period known to both the electronic reference device and the associated electronic device, transmit, to the associated electronic device, a second signal having a pulse width below a threshold and information that identifies the electronic reference device from among a plurality of other electronic reference devices in operative communication with the associated electronic device,
wherein the at least one predetermined anchor delay time period known to both the electronic reference device and the associated electronic device is different than each of a plurality of other predetermined anchor delay time periods unique to each of the plurality of other electronic reference devices thereby allowing the second signal to be transmitted to the associated electronic device spaced apart in time by the anchor delay time period relative to transmissions from the plurality of other electronic reference devices to the associated electronic device.

16. The electronic reference device according to claim 15, wherein the threshold provides an upper limit to the pulse width of the second signal, the upper limit being 10 ns.

17. A method, performed in an electronic device, for determining a position of the electronic device, the method comprising:
transmitting, to a plurality of electronic reference devices, a first signal, the first signal having a pulse width below a threshold;
receiving a plurality of second signals from the plurality of electronic reference devices comprising original second signals from each of the plurality of electronic reference devices and reflections of the original second signals;

filtering the reflections of the original second signals from the plurality of second signals leaving filtered received second signals;

determining a round-trip time of the filtered received second signals;

determining, based on the round-trip time of the filtered received second signals and at least one predetermined time period, a time of flight of each of the filtered received second signals;

determining, based on each time of flight, distances between the electronic device and each electronic reference device of the plurality of electronic reference devices, the distances comprising a first distance, and a second distance;

obtaining, from a memory circuitry, reference positions of the plurality of electronic reference devices;

associating the first distance with a first candidate electronic reference device having one of the reference positions;

associating the second distance with a second candidate electronic reference device having one of the remaining reference positions;

determining, based on the associations, one or more candidate positions of the electronic device; and determining, based on the distances, the one or more candidate positions and the obtained reference positions, a position of the electronic device.

18. The method according to claim 17, further comprising:

determining a different predetermined time period for each of the plurality of electronic reference devices according to:

k*(anchor delay), wherein k is an integer unique to each of the plurality of electronic reference devices, wherein (anchor delay) is a constant time period, whereby the plurality of second signals are received by the electronic device from each of the plurality of electronic reference devices at times spaced apart by the anchor delay.

19. The method according to claim 17, wherein the threshold provides an upper limit to the pulse width of the first signal, the upper limit being 10 ns.

20. The method according to claim 17, wherein the first signal and/or the filtered received second signals comprise a single-bit symbol.

21. The method according to claim 17, the method comprising:

selecting one of the one or more candidate positions of the electronic device;

determining whether a remaining distance corresponds to at least one of the remaining reference positions, and when it is determined that the remaining distance corresponds to at least one of the remaining reference positions, determining the position of the electronic device.

* * * * *